United States Patent
Murai et al.

(10) Patent No.: US 11,803,822 B2
(45) Date of Patent: Oct. 31, 2023

(54) INFORMATION MANAGEMENT APPARATUS

(71) Applicant: Honda Motor Co., Ltd., Tokyo (JP)

(72) Inventors: Yu Murai, Wako (JP); Satoshi Onodera, Tokyo (JP); Masahiro Ise, Wako (JP); Tsubasa Uchida, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 516 days.

(21) Appl. No.: 17/028,999

(22) Filed: Sep. 22, 2020

(65) Prior Publication Data

US 2021/0090034 A1  Mar. 25, 2021

(30) Foreign Application Priority Data

Sep. 24, 2019 (JP) ................. 2019-172496

(51) Int. Cl.
  *G06Q 10/30* (2023.01)
  *H01M 10/42* (2006.01)
  *H01M 10/54* (2006.01)

(52) U.S. Cl.
  CPC ........ *G06Q 10/30* (2013.01); *H01M 10/4285* (2013.01); *H01M 10/54* (2013.01)

(58) Field of Classification Search
  CPC .................................................. G06Q 10/30
  See application file for complete search history.

(56) References Cited

U.S. PATENT DOCUMENTS

2002/0161906 A1* 10/2002 Teraura ................. G06Q 10/087
  709/230
2016/0125548 A1* 5/2016 Bowles .............. G06Q 30/0237
  705/4

(Continued)

FOREIGN PATENT DOCUMENTS

JP  2002063246 A  2/2002
JP  2004094861 A  3/2004

(Continued)

OTHER PUBLICATIONS

Tweedale, A. C. (1992). Battery management program for a community with a solid waste landfill (Order No. EP72594). Available from ProQuest Dissertations and Theses Professional. (1690483396). (Year: 1992).*

(Continued)

*Primary Examiner* — Maria C Santos-Diaz
(74) *Attorney, Agent, or Firm* — Duft & Bornsen, PC

(57) ABSTRACT

An information management apparatus, including an electronic control unit including a microprocessor and a memory connected to the microprocessor. The microprocessor is configured to perform acquiring an information on a component to be dismantled within a predetermined period, setting a demand value representing a degree of a demand for a predetermined material, determining whether the demand value is greater than or equal to a predetermined value, and whether the predetermined material is included in the component based on the information, if it is determined that the demand value is greater than or equal to the predetermined value, and registering the component as an object of a recycle or a reuse, if it is determined that the predetermined material is included in the component.

8 Claims, 3 Drawing Sheets

(56) References Cited

U.S. PATENT DOCUMENTS

2020/0118088 A1* 4/2020 Kao ................. B65F 1/1484
2020/0250693 A1* 8/2020 Kanamori ............. G06Q 50/06

FOREIGN PATENT DOCUMENTS

JP       2004126669 A    4/2004
JP       2010250626 A    11/2010

OTHER PUBLICATIONS

Holmberg, F. (2017). Recycling of nickel metal hydride (NiMH) batteries; characterization and recovery of nickel, AB5 alloy and cobalt (Year: 2017).*
Aguilar, S. D. (2015). Electric vehicle (EV) storage supply chain risk and the energy market: A micro and macroeconomic risk management approach (Year: 2015).*
Japanese office action; Application 2019-172496; dated Mar. 29, 2022.

* cited by examiner

INFORMATION MANAGEMENT APPARATUS

CROSS-REFERENCE TO RELATED APPLICATION

This application is based upon and claims the benefit of priority from Japanese Patent Application No. 2019-172496 filed on Sep. 24, 2019, the content of which is incorporated herein by reference.

BACKGROUND OF THE INVENTION

Field of the Invention

This invention relates to an information management apparatus configured to manage an information on a recycled part or the like.

Description of the Related Art

Conventionally, as a device of this type, there has been a known apparatus configured to manage an information on a storage battery in use. Such an apparatus is described, for example, in Japanese Unexamined Patent Publication No. 2004-126669 (JP2004-126669A). In the device described in JP2004-126669A, the user terminal and the server device of the storage battery manufacturer are connected so as to be able to communicate with each other, a battery state of the storage battery owned by the user is analyzed by the server device, and a recovery schedule of the storage battery for recycling is calculated based on the analysis result.

In order to efficiently recover parts to be recycled or the like, it is preferable to grasp a degree of demand in the market for materials included in the parts. However, the devices described in JP2004-126669A is not configured to manage such an information including the degree of demand.

SUMMARY OF THE INVENTION

An aspect of the present invention is an information management apparatus, including an electronic control unit including a microprocessor and a memory connected to the microprocessor. The microprocessor is configured to perform acquiring an information on a component to be dismantled within a predetermined period, setting a demand value representing a degree of a demand for a predetermined material, determining whether the demand value is greater than or equal to a predetermined value, and whether the predetermined material is included in the component based on the information, if it is determined that the demand value is greater than or equal to the predetermined value, and registering the component as an object of a recycle or a reuse, if it is determined that the predetermined material is included in the component.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Hereinafter, an embodiment of the present invention is explained with reference to FIGS. 1 to 3. An information management apparatus according to the embodiment of the present invention is configured to manage an information on a battery (secondary battery) recycled after use. Hereafter, in relation to a battery used primarily in a vehicle including a travel motor, such as an electric vehicle or hybrid vehicle, an example of an information management apparatus will be described.

Figure 1:
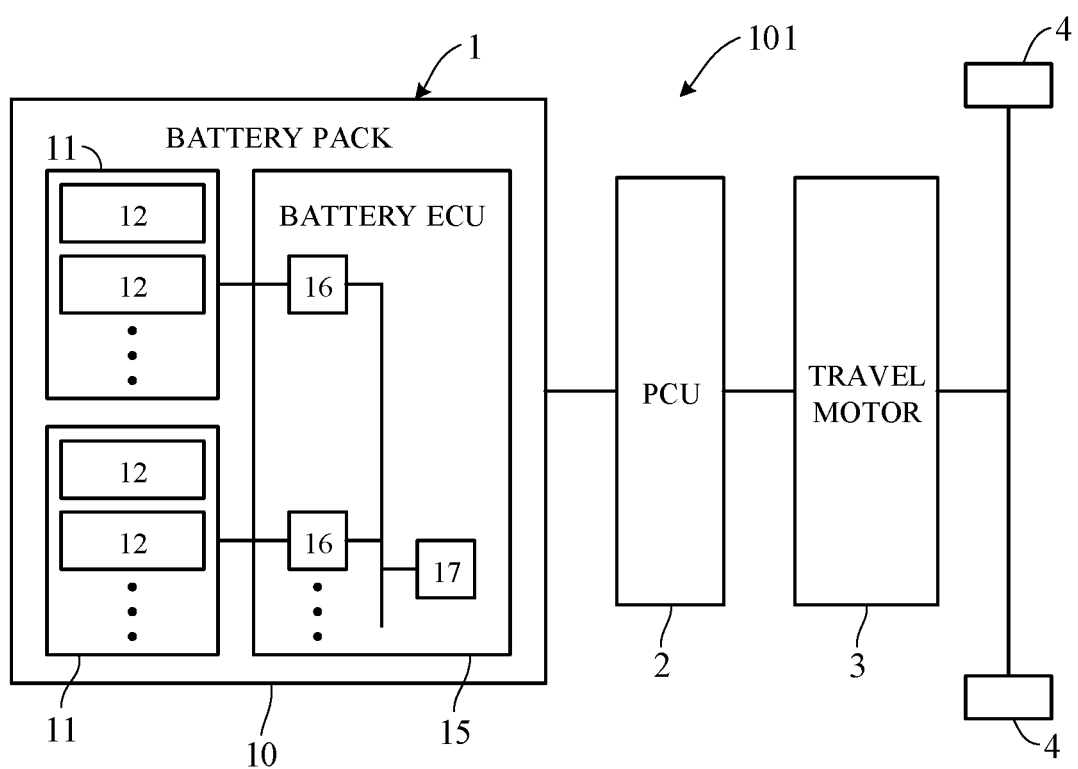
FIG. 1 is a diagram schematically showing a configuration of main components of a travel drive system of a motor-driven vehicle to which an information management apparatus according to an embodiment of the invention is applied.

FIG. 1 is a diagram schematically showing a configuration of main components of a travel drive system of a motor-driven vehicle 101 (may be simply referred to as a vehicle) to which the information management apparatus according to the present embodiment is applied. As shown in FIG. 1, the vehicle 101 includes a battery 1, a power control unit (PCU) 2, and a travel motor 3.

The battery 1 is configured as a unit by a single battery pack 10. The battery 1 may be configured by multiple battery packs 10. If the battery 1 is configured by the single battery pack 10 as seen in the present embodiment, the battery 1 and battery pack 10 are the same. For this reason, hereafter, the battery pack 10 may be referred to as the battery 1.

The battery pack 10 includes multiple battery modules 11 and a battery ECU (Electronic Control Unit) 15. The battery modules 11 are connected with each other in series or in parallel through a bus bar or the like. These battery modules 11 each include multiple cells 12. The cell 12 is, for example, a flat lithium-ion cell sealed by a laminate film and includes electrode plates. The cells 12 are housed in the sealed housing of the battery module 11 so as to connect the electrode plates in series or in parallel, forming a lithium-ion battery.

Among the batteries 1, for example, electrodes of the cells 12 (e.g., positive electrodes) becomes a target of recycle. That is, the cell 12 as a waste material taken out through a dismantling operation of the battery 1 is returned to a predetermined metal material (e.g., cobalt, nickel, etc.) through a processing such as melting, and is reused. The material obtained by recycling is called a recycled material. The recycled material can be used not only as the battery 1 but also as a component of various parts. Other elements of the battery 1 (such as a housing, etc.) become a target of reuse, and are used for a production of the battery 1 or the like.

The battery ECU 15 includes multiple detection circuits 16 that detect respective states of the battery modules 11 and a detection circuit 17 that detects a state of the battery pack 10. For example, the detection circuits 16 each include sensors that detect the physical quantities, such as the current, voltage, and temperature, of the corresponding battery module 11. The detection circuits 16 calculate a state of charge SOC and a state of health SOH of the respective battery modules 11 on the basis of the detected physical quantities. The detection circuit 17 calculates the SOC and SOH of the entire battery on the basis of signals from the detection circuits 16.

The SOH is a value representing the degree of degradation of the battery 1. The SOH is defined as the retention ratio of the battery capacity reduced with time with respect to the battery performance when the battery was new (=capacity at certain time/initial capacity). The battery 1 is healthier as its SOH is higher. The SOH may be defined as the increase rate of the internal resistance (resistance value at certain time/initial resistance value) rather than the capacity retention ratio.

When the SOH becomes equal to or smaller than a predetermined lower-limit value, the cruising range travelable by charging the battery once becomes equal to or smaller than a reference value or other problems occur. Accordingly, the battery needs to be replaced. At this time, the battery 1 with performance degraded is dismantled, and then reused or recycled as necessary. Also, when the vehicle 101 is discarded, the battery 1 mounted on the vehicle 101 is similarly dismantled, and then reused or recycled as necessary.

The battery 1 supplies power to the power control unit (PCU) 2 through a junction box (not shown). The power control unit 2 includes an inverter circuit. The power control unit 2 converts a direct current from the battery 1 into an alternating current using the inverter circuit and supplies a drive power to the travel motor 3. Thus, the travel motor 3 is driven, drive wheels 4 are rotationally driven, and the vehicle 101 travels.

Figure 2:
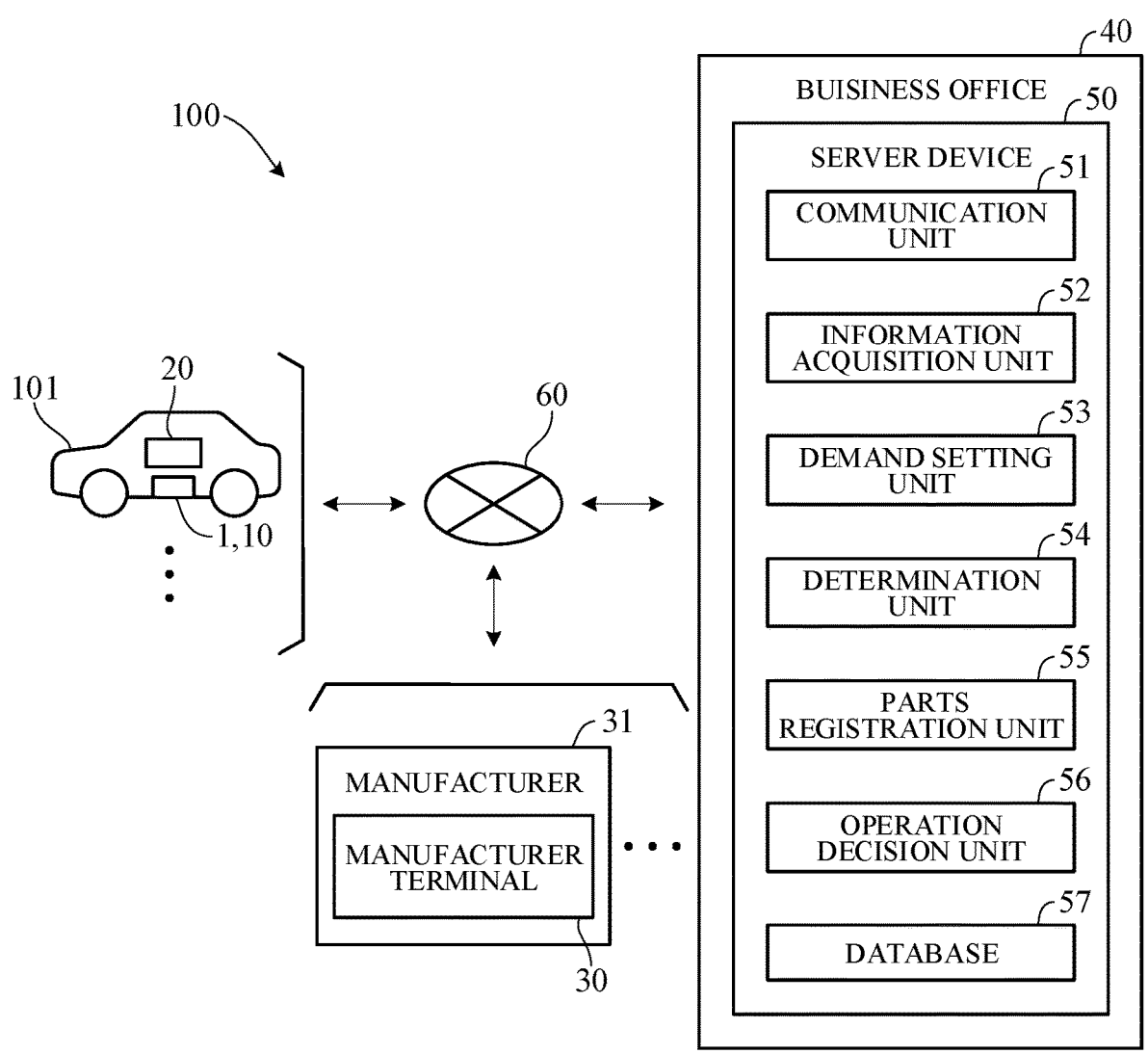
FIG. 2 is a block diagram schematically showing an overall configuration of an information management system including the information management apparatus according to the embodiment of the present invention.

FIG. 2 is a block diagram schematically showing the overall configuration of an information management system 100 including the information management apparatus according to the present embodiment. As shown in FIG. 2, the information management system 100 includes vehicle terminals 20 of multiple (only one is shown) vehicles 101 registered in the information management system 100 in advance, terminals (manufacturer terminals) of multiple (only one is shown) manufacturers 31 which manufactures products with the predetermined material, and a server device 50 which a business office 40 for performing a recycling business has.

The business office 40 not only performs recycling business for taking out recycled materials of the battery 1, but also performs sales business for selling recycled materials and the same kind of materials as recycled materials. The materials sold at the business office 40 are purchased by the manufacturer 31. The recycling business and the sales business may be conducted at different business offices 40. The server device 50 mainly constitutes an information management apparatus according to the present embodiment.

As shown in FIG. 2, the vehicle terminals 20, the manufacturer terminals 30, and the server device 50 are connected to a network 60, such as a public wireless communication network typified by the Internet network or mobile telephone network, and are able to communicate with each other through the network 60. Examples of the network 60 also include closed communication networks provided for predetermined control areas, for example, wireless LANs, Wi-Fi (registered trademark), and the like.

The vehicle 101 includes batteries 1 (battery packs 10). These batteries 1 are batteries to be dismantled within a predetermined period, for example, one month. The vehicle terminal 20 includes, as a functional configuration, a communication unit that makes communications through the network 60. The vehicle terminal 20 transmits a vehicle information and battery information on each vehicle 101 to the server device 50 through the communication unit along with a vehicle ID for identifying the vehicle 101 and a battery ID for identifying the battery 1 at a predetermined timing.

The battery information includes information indicating the SOH of the battery modules 11 and the SOH of the battery pack 10 calculated by the battery ECU 15, and information on the material constituting the cell 12 (information on quality and amount of the material). The battery information also includes information about failures and repairs of the battery 1 in the past (details, times, etc.) and information about replacement of the battery 1 in the past (the reasons for replacement, the times of replacement, etc.). Battery module IDs for identifying the battery modules 11 and a battery pack ID for identifying the battery pack 10 are respectively assigned to the battery modules 11 and the battery pack 10. The vehicle terminal 20 transmits the battery module IDs and the battery pack ID along with the battery information.

The vehicle information includes information such as the ID of the battery 1 mounted on the vehicle 101 (battery ID, etc.), the vehicle type of the vehicle 101, the year type, travel distance and registered address, and further other information of the vehicle to be discarded and information of the battery replacement schedule. The vehicle 101 scheduled to be discarded and battery replaced is a vehicle having a recyclable battery 1 within a predetermined period. The recyclable battery 1 constitutes a part to be recycled (a recycled object part).

Each of the plurality of manufacturers 31 is a business office that manufactures a product containing a predetermined material. In the following, for convenience of explanation, it is assumed that only a plurality of manufacturers 31 are consumers of a predetermined material. The manufacturer terminal 30 includes, as a functional configuration, a communication unit for performing communication via the network 60. The manufacturer terminal 30 transmits demand information including a type, a required amount and a required time (desired delivery time) of a predetermined material (referred to as a manufacturer request material) requested by the manufacturers 31 to the server device 50 at a predetermined timing via the communication unit.

The server device 50 is formed, for example, as a single server or as distributed servers consisting of servers having different functions. The server device 50 may be formed as distributed virtual servers created in the cloud environment, which are called cloud servers. The server device 50 includes an arithmetic processing unit including a CPU (microprocessor), memory such as ROM or RAM, and other peripheral circuits.

The server device 50 includes, as functional configurations, a communication unit 51, an information acquisition unit 52, a demand value setting unit 53, a determination unit 54, a parts registration unit 55, an operation decision unit 56 and a database 57. The CPU serves as the information acquisition unit 52, the demand value setting unit 53, the determination unit 54, the parts registration unit 55 and the operation decision unit 56, and the memory serves as the database 57.

The communication unit 51 is configured to be able to wirelessly communicate with the vehicle terminals 20 and the manufacturer terminals 30 through the network 60. The communication unit 51 communicates with the vehicle terminals 20 and the manufacturer terminals 30 in a predetermined cycle or at a predetermined timing, and receives and transmits various types of information therefrom and thereto.

The information acquisition unit 52 acquires the vehicle information and the battery information transmitted from the vehicle terminals 20 of the vehicles 101 along with the corresponding battery IDs and vehicle IDs. That is, the information acquisition unit 52 acquires an ID of the battery 1 as a recycled object part, an ID of the vehicle 101 having the recycled object part, and information on a constituent material of the cell 12 of the battery 1, etc. Further, the information acquisition unit 52 acquires a demand information of a manufacturer request material from the manufacturer terminal 30.

The demand value setting unit 53 sets a demand value α representing a degree of demand for the manufacturer request material based on the demand information of the manufacturer request material acquired by the information acquisition unit 52. The demand value α corresponds to, for example, a value obtained by subtracting the amount of the same kind of material stored in the business office 40 from the required amount of the manufacturer request material. If the required amount of the manufacturer request material is equal to or less than the storage amount in the business office 40, the demand value α is 0 because there is no need to newly generate the manufacturer request material. The demand value α may be set in consideration of a desired delivery time included in the demand information. For example, the shorter the desired delivery time, the higher the degree of demand for the manufacturer request material, and therefore the demand value α may be increased.

The determination unit 54 determines whether or not the demand value α set by the demand value setting unit 53 is equal to or greater than a predetermined value α1. This determination is a determination as to whether or not a recycling operation is necessary at the business office 40 in order to acquire the manufacturer request material within a predetermined period of time, and the predetermined value α 1 is, for example, a value larger than 0. When a material of the same kind as the recycled material can be obtained by a method other than recycling within the predetermined period, the predetermined value α1 may be set to a lower value in consideration of the amount of the material.

If it is determined that the demand value α is equal to or greater than the predetermined value α1, the determination unit 54 further determines whether or not the battery 1 to be recycled includes the manufacturer request material based on the battery information acquired by the information acquisition unit 52. This determination is a determination as to whether or not recycling is necessary for each battery 1. That is, even if the recycling operation is performed for the battery 1 that does not include the manufacturer request material, the manufacturer request material is not obtained, and therefore, the determination unit 54 determines whether or not the manufacturer request material is included in the battery 1 in order to perform the effective recycling operation.

When it is determined by the determination unit 54 that the battery 1 to be recycled includes the manufacturer request material, the parts registration unit 55 registers the ID of the battery 1 specified by the battery information acquired by the information acquisition unit 52 in the database 57 as a recycled object part. As a result, since the battery 1 having the manufacturer demand material whose supply to the market is insufficient is registered in the database 57 in advance, the desired manufacturer request material can be obtained through the recycling operation. Therefore, the insufficient supply of the manufacturer request material can be compensated.

The operation decision unit 56 decides the ID of the battery 1 to be recycled among the parts registered in the database 57 by the parts registration unit 55. According to this decision, in the business office 40, the recycling operation of the battery 1 which is the recycled object part is performed, and then the recycled material is obtained.

The battery information acquired by the information acquisition unit 52 includes information on the amount of the material contained in the battery 1. Therefore, when registering the battery ID as a recycled object part, the parts registration unit 55 may rank the battery 1 in advance based on the information of the amount of the material and register the ranked information along with the battery ID. For example, the rank of the battery 1 is increased as the amount of the predetermined material included in the battery 1 is increased. Thus, the operation decision unit 56 makes it possible to preferentially select the battery 1 having the higher rank as the higher demand value α as the target of the recycling operation. Therefore, considering the shortage amount of the manufacturer request material (demand value α, etc.), it is possible to appropriately determine which battery 1 should be preferentially recycled at the business office 40.

The parts registration unit 55 may calculate the number of used batteries 1 for obtaining the required amount of the manufacturer request material, based on the amount of the material included in each battery 1 and the demand value α set by the demand value setting unit 53, and register the calculated information on the number together. Thus, the operation decision unit 56 can easily determine how many of the used battery 1 needs to be secured as the recycled object part to satisfy the demand of the manufacturer request material, and therefore, the recycling operation can be performed efficiently and systematically.

Figure 3:
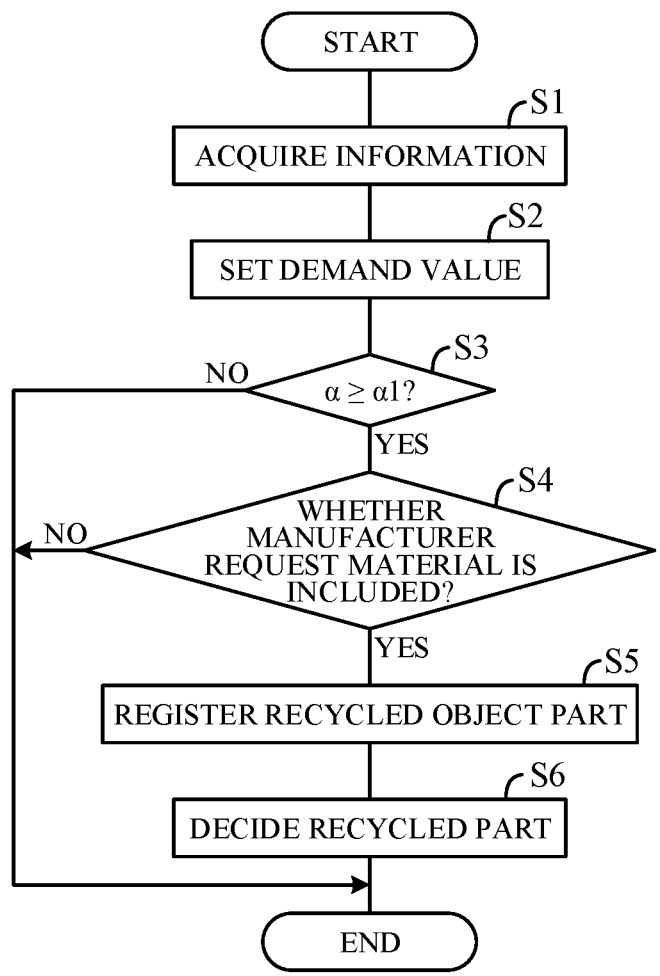
FIG. 3 is a flowchart showing an example of a processing performed by a CPU of a server device in FIG. 2.

FIG. 3 is a flowchart showing an example of a processing performed by the CPU of the server device 50 in accordance with a predetermined program. The processing shown in this flowchart is mainly performed by the information acquisition unit 52, the demand value setting unit 53, the determination unit 54, the parts registration unit 55 and the operation decision unit 56. This processing is started when a request command for the predetermined material (manufacture request material) is transmitted from the manufacturer terminal 30.

First, in S1 (S: processing step), the server device 50 (CPU) acquires the vehicle information and the battery information transmitted from the vehicle terminals 20 and the demand information for the manufacturer request material transmitted from the manufacturer terminals 30 through the communication unit 51. Nest, in S2, the server device 50 sets the demand value α for the manufacturer request material based on the demand information acquired in S1.

Next, in S3, the server device 50 determines whether or not the demand value α set in S2 is equal to or greater than the predetermined value α1, that is, whether or not a recycling operation is necessary in order to acquire the manufacturer request material. If the determination in S3 is YES, the processing proceeds to S4, and if the determination is NO, the processing ends.

In S4, the server device 50 determines whether or not the manufacturer request material is included in the battery 1 based on the battery information acquired in S1. This determination is made for all batteries 1 that are scheduled to be dismantled within a predetermined period. If the determination in S4 is YES, the processing proceeds to S5, and if the determination is NO, the processing ends.

In S5, the server device 50 registers the ID of the battery 1 determined in S4 to include the manufacturer request material in the database 57. At this time, the information on the content amount of the manufacturer request material included in each battery 1 may also be registered. Also, the number of batteries 1 required to secure the required amount of the manufacture request material may also be registered.

In S6, the server device 50 decides the battery 1 to perform the recycling operation from among the battery ID registered in S5. At this time, when the recycling operation of the plurality of batteries 1 is performed, the order in which the recycling operation is performed is also decided.

The operation of the information management apparatus according to the present embodiment is summarized as follows. When the demand information of the manufacturer request material (e.g., cobalt) is transmitted from the manufacturer terminal 30, it is determined whether or not recycling of the battery 1 including the manufacturer request material is necessary based on whether or not the demand value $\alpha$ is equal to or greater than the predetermined value $\alpha 1$ (S3). Then, when it is determined that $\alpha \geq \alpha 1$, whether or not the manufacturer request material is included in the battery 1 to be recycled is determined, and when it is determined that the manufacturer request material is included, the battery 1 is registered as a recycled object part (S4 and S5). As a result, it is possible to accurately realize an appropriate supply for demand of the manufacturer request materials through the recycling operation.

On the other hand, when it is determined that $\alpha < \alpha 1$, the battery 1 is not registered as a recycled object part, for example, is dismantled as it is without being recycled, because the degree of demand for the predetermined material is low. Further, even if it is determined that $\alpha \geq \alpha 1$, when it is determined that the manufacturer request material is not included in the battery 1, the battery 1 is not registered as a recycled object part, for example, is dismantled as it is without being recycled, because it is impossible to obtain the predetermined material even if the battery 1 is recycled. Thus, since the battery 1 is to be recycled as necessary, it is possible to optimally perform the recycling operation.

The present embodiment can achieve advantages and effects such as the following:

(1) An information management apparatus according to the present embodiment includes: an information acquisition unit 52 acquiring an information on the battery 1 to be dismantled within a predetermined period; a demand value setting unit 53 setting a demand value $\alpha$ representing a degree of demand for a manufacturer request material which the manufacturer 31 requires; a determination unit 54 determining whether the demand value set by the demand value setting unit 53 is greater than or equal to a predetermined value al, and whether the manufacture request material is included in the battery 1 based on the information acquired by the information acquisition unit 52, if it is determined that the demand value $\alpha$ is greater than or equal to the predetermined value $\alpha 1$; and a parts registration unit 55 registering the ID of the battery 1 identified by the battery information acquired by the information acquisition unit 52 as an recycled object part, if it is determined by the determination unit 54 that the manufacturer request material is included in the battery 1 (FIG. 2).

With this configuration, after grasping the degree of demand in the market of the manufacturer request material included in the battery 1, the battery 1 to be recycled object part is registered in the database 57. Therefore, the battery 1 can be efficiently recovered, and the shortage of the manufacturer request material can be easily covered by the recycled material. In addition, since the battery 1 having the demanded material is used for recycling, the recycling operation can be efficiently performed.

(2) In the present embodiment, the battery of the motor-driven vehicle 101 is used as the recycled object part. Since the electrode constituting the cell 12 of the lithium ion battery has high recycling requirements, it is particularly effective to apply the information management apparatus as in the present embodiment.

(3) The battery information includes information on an amount (a content amount) of the manufacturer request material included in each battery 1. The parts registration unit 55 ranks the plurality of batteries 1 based on the information on the content amount and registers further an information on the plurality of batteries ranked. As a result, it is possible to easily determine the priority of recycling of the battery 1, and it is possible to perform an efficient recycling operation.

(4) The parts registration unit 55 further calculates a required number of the battery 1 for satisfying the demand for the manufacture request material, based on the information on the content amount of the manufacturer request material and the demand value $\alpha$ set by the demand value setting unit 53, and registers further an information on the required number calculated. As a result, it is possible to systematically perform a recycling operation to satisfy the demands for the manufacturer request material.

Various modifications of the above embodiment are possible. Some examples are explained in the following. In the above embodiment, the information acquisition unit 52 acquires information on the battery 1 to be dismantled within a predetermined period including the manufacturer request material. However, a component including the manufacturer request material is not limited to the battery. For example, when a predetermined material required by the manufacturer is a neodymium magnet, a motor including the neodymium magnet may be used as a component. The component may be a part used in a product other than the vehicle, and may be a finished product not a part.

In the above embodiment, an overall of the battery 1 is registered as a recycled object part in the database 57, a part of battery elements (battery pack 10, battery module 11, and cell 12) constituting the battery 1 may be registered as an object of a recycle and others may be registered as an object of a reuse. For example, the determination unit 54 may determine whether or not the performance of each battery module 11 is good based on signal from the detection circuits 16, and the parts registration unit may register the ID of the battery module 11 that is determined to be good in performance as a target of reuse. More specifically, the ID of the battery module 11 having a value (performance value) representing the battery performance such as SOH or the like that is equal to or higher than a predetermined value may be registered as an object of reuse, and the battery module 11 having a value less than the predetermined value may be registered as an object of recycle. Therefore, the parts registration unit 55 as a registration unit may register each component (such as the battery pack 10 and the battery module 11) in the database 57 not only as a target of recycle but also as a target of reuse. Even when the material obtained by disassembly (dismantling) of a component is used as a predetermined material as it is, it may be registered in the registration unit as a target of reuse instead of recycling.

Although in the above embodiment, the demand value setting unit 53 sets the demand value α for the predetermined material based on the demand information of the manufacturer request material from the plurality of manufacturer terminals 30, the demand value may be set in consideration of not only the information from the manufacturer terminals 30 but also various types of information such as the underground or undersea reserves of the predetermined material becoming a predetermined amount or less within a predetermined period of time. Although in the above embodiment, the determination unit 54 determines whether or not the manufacturer request material is included in the battery 1, rather than simply determining whether it is included, it determines whether or not the manufacturer request material more than a predetermined amount is included, when it is determined that the manufacturer request material more than the predetermined amount is included, the battery may be registered as an object of recycle or reuse.

The present invention can be configured as an information management method including: acquiring an information on a component such as the battery 1 to be dismantled within a predetermined period; setting a demand value α representing a degree of a demand for a predetermined material; determining whether the set demand value α is greater than or equal to a predetermined value al, and whether the predetermined material is included in the component based on the acquired information, if it is determined that the demand value α is greater than or equal to the predetermined value α1; and registering the component identified by the acquired information as an object of a recycle or a reuse, if it is determined that the predetermined material is included in the component.

The above embodiment can be combined as desired with one or more of the above modifications. The modifications can also be combined with one another.

According to the present invention, since a component becomes an object of a recycle or reuse in consideration of a degree of a demand for a predetermined material included in the component, it is possible to effectively perform a reclamation of the component.

Above, while the present invention has been described with reference to the preferred embodiments thereof, it will be understood, by those skilled in the art, that various changes and modifications may be made thereto without departing from the scope of the appended claims.

What is claimed is:

1. An information management apparatus, comprising
an electronic control unit including a microprocessor and a memory connected to the microprocessor, and
a communication unit configured to:
communicate with a vehicle terminal equipped in a vehicle and a manufacturer terminal of a consumer of a predetermined metal material, via a network in a predetermined cycle or at a predetermined timing and
acquire information from the vehicle terminal and the manufacturer terminal, wherein the microprocessor is configured to perform:
setting a demand value representing a degree of a demand for the predetermined metal material based on first information acquired from the manufacturer terminal through the communication unit and including at least a required amount of the predetermined metal material;
determining a component used in the vehicle is to be dismantled within a predetermined period and the predetermined metal material is included in the component based on second information acquired from the vehicle terminal through the communication unit including information on the vehicle and information on the component and to which identification information of the component is attached, when the demand value is greater than or equal to a predetermined value;
deciding the component as an object of recycle or reuse, when it is determined that the component is to be dismantled within the predetermined period and the predetermined metal material is included in the component; and
storing the identification information of the component decided as the object of recycle or reuse into the memory, wherein the identification information on the component includes a content amount of the predetermined metal material,
the microprocessor is configured to further perform
ranking a plurality of components based on the information on the content amount of the predetermined metal material of each of a plurality of components when the plurality of components is decided as the object of recycle or reuse, and
wherein the microprocessor is configured to perform the storing including storing the rank corresponding to each of the plurality of components along with the identification information corresponding to each of the plurality of components.

2. The information management apparatus according to claim 1, wherein
the component is a battery or a battery element constituting the battery, and
the predetermined metal material is a cobalt or a nickel.

3. The information management apparatus according to claim 1, wherein
the information on the component includes information on a content amount of the predetermined metal material included in the each of the plurality of components, and
the microprocessor is configured to further perform
calculating a required number of the components for satisfying the demand value for the predetermined metal material, based on the information on the content amount of the predetermined metal material and the demand value, and
the storing including storing information on the required number of the components.

4. The information management apparatus according to claim 1, wherein
the microprocessor is configured to perform
the determining including determining whether a performance value representing a degree of a performance of the component including the predetermined metal material is greater than or equal to a predetermined performance value, and
the deciding including deciding the component as the object of the reuse if it is determined that the performance value is greater than or equal to the predetermined performance value, while deciding the component as the object of the recycle if it is determined that the performance value is less than the predetermined performance value.

5. The information management apparatus according to claim 1, wherein
the microprocessor is configured to perform
the determining including determining whether the predetermined metal material greater than or equal to a predetermined amount is included in the component, and
the deciding including deciding the component as the object of the recycle or the reuse if it is determined that the predetermined metal material greater than or equal to the predetermined amount is included in the component.

6. An information management method of an information management apparatus comprising an electronic control unit comprising a microprocessor and a memory connected to the microprocessor and a communication unit configured to communicate with a vehicle terminal equipped in a vehicle and a manufacturer terminal of a consumer of a predetermined metal material, via a network in a predetermined cycle or at a predetermined timing and to acquire information from the vehicle terminal and the manufacturer terminal, the information management method comprising:
setting a demand value representing a degree of a demand for the predetermined metal material based on first information acquired from the manufacturer terminal through the communication unit including at least a required amount of the predetermined metal material;
determining a component used in the vehicle is to be dismantled within a predetermined period and the predetermined metal material is included in the component based on second information acquired from the vehicle terminal through the communication unit including information on the vehicle and information on the component and to which identification information of the component is attached, when the demand value is greater than or equal to a predetermined value;
deciding the component as an object of recycle or reuse, when it is determined that the component is to be dismantled within the predetermined period and the predetermined metal material is included in the component; and
storing the identification information of the component decided as the object of recycle or reuse into the memory, wherein the identification information on the component includes a content amount of the predetermined metal material,
ranking a plurality of components based on the content amount of the predetermined metal material of each of a plurality of components when the plurality of components is decided as the object of recycle or reuse, and
storing the rank corresponding to each of the plurality of components along with the identification information corresponding to each of the plurality of components.

7. The information management apparatus according to claim 1, wherein
the microprocessor is configured to perform
the ranking including ranking each of the plurality of components so that the higher the content amount of the predetermined metal material, the higher the rank, and wherein
the microprocessor is configured to further perform
deciding an order of a recycling operation to obtain the predetermined metal material for each of the plurality of components so that the recycling operation is preferentially performed for the component with higher ranks.

8. An information management system including:
a manufacturer terminal of a consumer of a predetermined metal material comprising:
a first communication unit configured to transmit via a network first information
including at least a required amount of the predetermined metal material;
a vehicle terminal equipped in a vehicle comprising:
a second communication unit configured to transmit via the network second information including information associated with the vehicle and information on a component used in the vehicle, to which identification information of the component is attached;
an information management apparatus comprising:
an electronic control unit comprising a microprocessor and a memory connected to the microprocessor, and
a third communication unit configured to communicate with the vehicle terminal and the manufacturer terminal via the network, in a predetermined cycle or at a predetermined timing, to acquire the first information and second information
wherein the microprocessor is configured to:
setting a demand value representing a degree of a demand for the predetermined metal material based on the first information acquired from the manufacturer terminal through the third communication unit;
determining the component used in the vehicle is to be dismantled within a predetermined period and the predetermined metal material is included in the component based on the second information acquired from the vehicle terminal through the third communication unit, when the demand value is greater than or equal to the predetermined value;
deciding the component as an object of recycle or reuse, when it is determined that the component is to be dismantled within the predetermined period and the predetermined metal material is included in the component;
storing the identification information of the component decided as the object of recycle or reuse into the memory, wherein the identification information on the component includes a content amount of the predetermined metal material;
ranking a plurality of components based on the information on the content amount of the predetermined metal material of each of a plurality of components when the plurality of components is decided as the object of recycle or reuse; and
storing the rank corresponding to each of the plurality of components along with the identification information corresponding to the each of the plurality of components.

* * * * *